US012646859B2

(12) United States Patent
Yoshikawa et al.

(10) Patent No.: US 12,646,859 B2
(45) Date of Patent: Jun. 2, 2026

(54) COMPOSITE ANTENNA

(71) Applicant: KYOCERA CORPORATION, Kyoto (JP)

(72) Inventors: Hiromichi Yoshikawa, Yokohama (JP); Nobuki Hiramatsu, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 188 days.

(21) Appl. No.: 18/719,258

(22) PCT Filed: Dec. 5, 2022

(86) PCT No.: PCT/JP2022/044779
§ 371 (c)(1),
(2) Date: Jun. 13, 2024

(87) PCT Pub. No.: WO2023/112756
PCT Pub. Date: Jun. 22, 2023

(65) Prior Publication Data
US 2025/0070480 A1 Feb. 27, 2025

(30) Foreign Application Priority Data
Dec. 15, 2021 (JP) ................................ 2021-203433

(51) Int. Cl.
*H01Q 21/06* (2006.01)
*H01Q 5/314* (2015.01)

(52) U.S. Cl.
CPC .......... *H01Q 21/065* (2013.01); *H01Q 5/314* (2015.01)

(58) Field of Classification Search
CPC ......... H01Q 21/065; H01Q 5/314; H01Q 3/46
See application file for complete search history.

(56) References Cited

U.S. PATENT DOCUMENTS

2009/0079637 A1 3/2009 Fukui et al.
2009/0140929 A1* 6/2009 Inoue ..................... H01Q 1/243 343/700 MS
2014/0091970 A1* 4/2014 Yu ........................ H01Q 9/0407 343/700 MS
2019/0305432 A1 10/2019 Kim et al.

FOREIGN PATENT DOCUMENTS

JP 2015231182 A 12/2015

* cited by examiner

*Primary Examiner* — Dieu Hien T Duong
(74) *Attorney, Agent, or Firm* — HAUPTMAN HAM, LLP

(57) ABSTRACT

A composite antenna includes a plurality of unit structures arranged in a first plane direction, a reference conductor serving as a reference potential of the plurality of unit structures, and an antenna element provided around the arranged plurality of unit structures and electromagnetically connected to the reference conductor. The plurality of unit structures each includes a first resonator extending in the first plane direction, a second resonator away from the first resonator in a first direction and extending in the first plane direction, and a connector magnetically or capacitively connecting the first resonator and the second resonator in the first direction.

6 Claims, 7 Drawing Sheets

COMPOSITE ANTENNA

RELATED APPLICATIONS

The present application is a National Phase of International Application No. PCT/JP2022/044779 filed Dec. 5, 2022, which claims priority to Japanese Application No. 2021-203433, filed Dec. 15, 2021.

TECHNICAL FIELD

The present disclosure relates to a composite antenna.

BACKGROUND OF INVENTION

A known technique involves controlling electromagnetic waves without using a dielectric lens. For example, Patent Document 1 describes a technique of refracting radio waves by changing parameters of respective elements in a structure including an array of resonator elements.

CITATION LIST

Patent Literature

Patent Document 1: JP 2015-231182 A

SUMMARY

A composite antenna according to the present disclosure includes a plurality of unit structures arranged in a first plane direction, a reference conductor serving as a reference potential of the plurality of unit structures, and an antenna element provided around the arranged plurality of unit structures and electromagnetically connected to the reference conductor, in which the plurality of unit structures each include a first resonator extending in the first plane direction, a second resonator away from the first resonator in a first direction and extending in the first plane direction, and a connector magnetically or capacitively connecting the first resonator and the second resonator in the first direction.

A composite antenna according to the present disclosure includes a plurality of unit structures arranged in a first plane direction, a reference conductor serving as a reference potential of the plurality of unit structures, and a peripheral conductor surrounding the arranged plurality of unit structures and capacitively connected to the reference conductor, in which the plurality of unit structures each include a first resonator extending in the first plane direction, a second resonator away from the first resonator in a first direction and extending in the first plane direction, a connector magnetically or capacitively connecting the first resonator and the second resonator in the first direction, and an antenna port connected between the reference conductor and the peripheral conductor.

DESCRIPTION OF EMBODIMENTS

Embodiments of the present disclosure will be described in detail with reference to the drawings. The embodiments described below do not limit the present disclosure.

In the following description, an XYZ orthogonal coordinate system is set, and the positional relationship between respective portions will be described by referring to the XYZ orthogonal coordinate system. A direction parallel to an X-axis in a horizontal plane is defined as an X-axis direction, a direction parallel to a Y-axis orthogonal to the X-axis in the horizontal plane is defined as a Y-axis direction, and a direction parallel to a Z-axis orthogonal to the horizontal plane is defined as a Z-axis direction. A plane including the X-axis and the Y-axis is appropriately referred to as an XY plane, a plane including the X-axis and the Z-axis is appropriately referred to as an XZ plane, and a plane including the Y-axis and the Z-axis is appropriately referred to as a YZ plane. The XY plane is parallel to the horizontal plane. The XY plane, the XZ plane, and the YZ plane are orthogonal to each other.

First Embodiment

Composite Antenna

Figure 1:
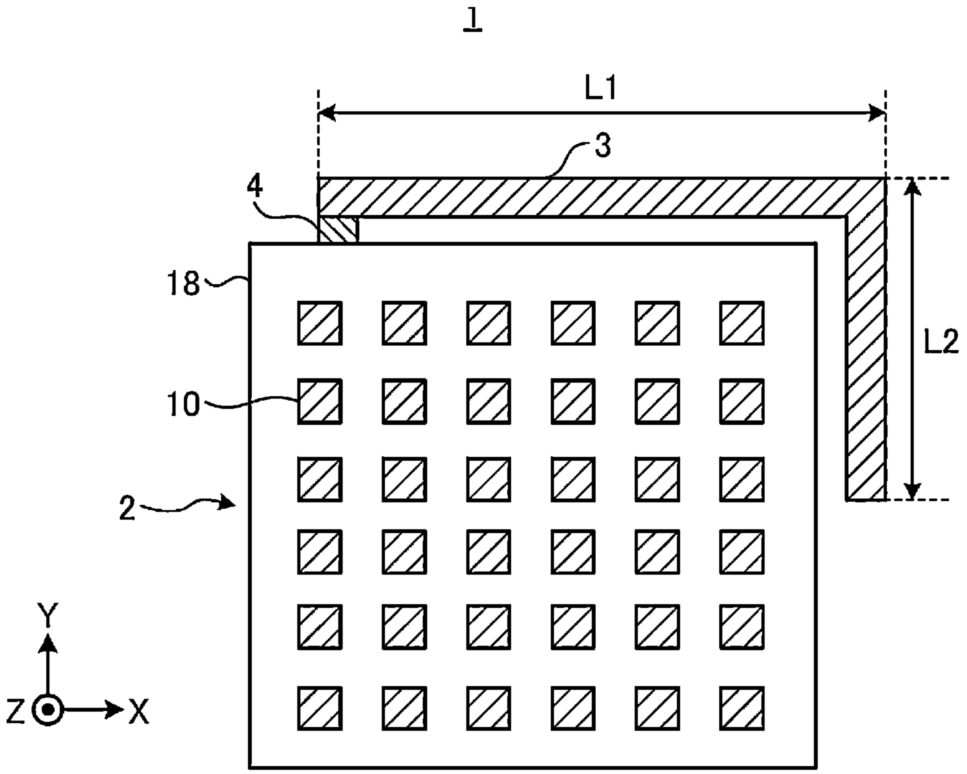
FIG. 1 illustrates a configuration example of a composite antenna according to a first embodiment.

A configuration example of a composite antenna according to a first embodiment is described with reference to FIG. 1. FIG. 1 illustrates a configuration example of the composite antenna according to the first embodiment.

As illustrated in FIG. 1, a composite antenna 1 according to the first embodiment includes a radio wave refracting plate 2 and an antenna element 3.

The composite antenna 1 reflects or permeates electromagnetic waves of a first frequency band used for communication between a base station and a communication device in a specific direction. Permeating includes permeating the received electromagnetic wave without changing its angle and refracting it in a specific direction. Specifically, the composite antenna 1 reflects or permeates millimeter waves in a specific direction by the radio wave refracting plate 2, the millimeter wave enabling high-speed large-capacity data communication in the fifth or sixth generation mobile communication system or the like.

The composite antenna 1 causes the antenna element 3 to transmit and receive electromagnetic waves of a second frequency band lower in frequency than the first frequency band.

The radio wave refracting plate 2 includes the plurality of unit structures 10 and the reference conductor 18.

The plurality of unit structures 10 are arranged in the XY plane direction. The XY plane direction may also be referred to as a first plane direction. That is, the plurality of unit structures 10 are arranged two-dimensionally. In the present embodiment, each of the plurality of unit structures 10 has a resonance structure. The structure of the unit structure 10 will be described later. The reference conductor 18 may be a reference conductor of the composite antenna 1. For example, the reference conductor 18 is a ground conductor, but not limited thereto. The unit structures 10 are arranged two dimensionally with respect to the reference conductor 18.

Configuration of Unit Structure

Figure 2:
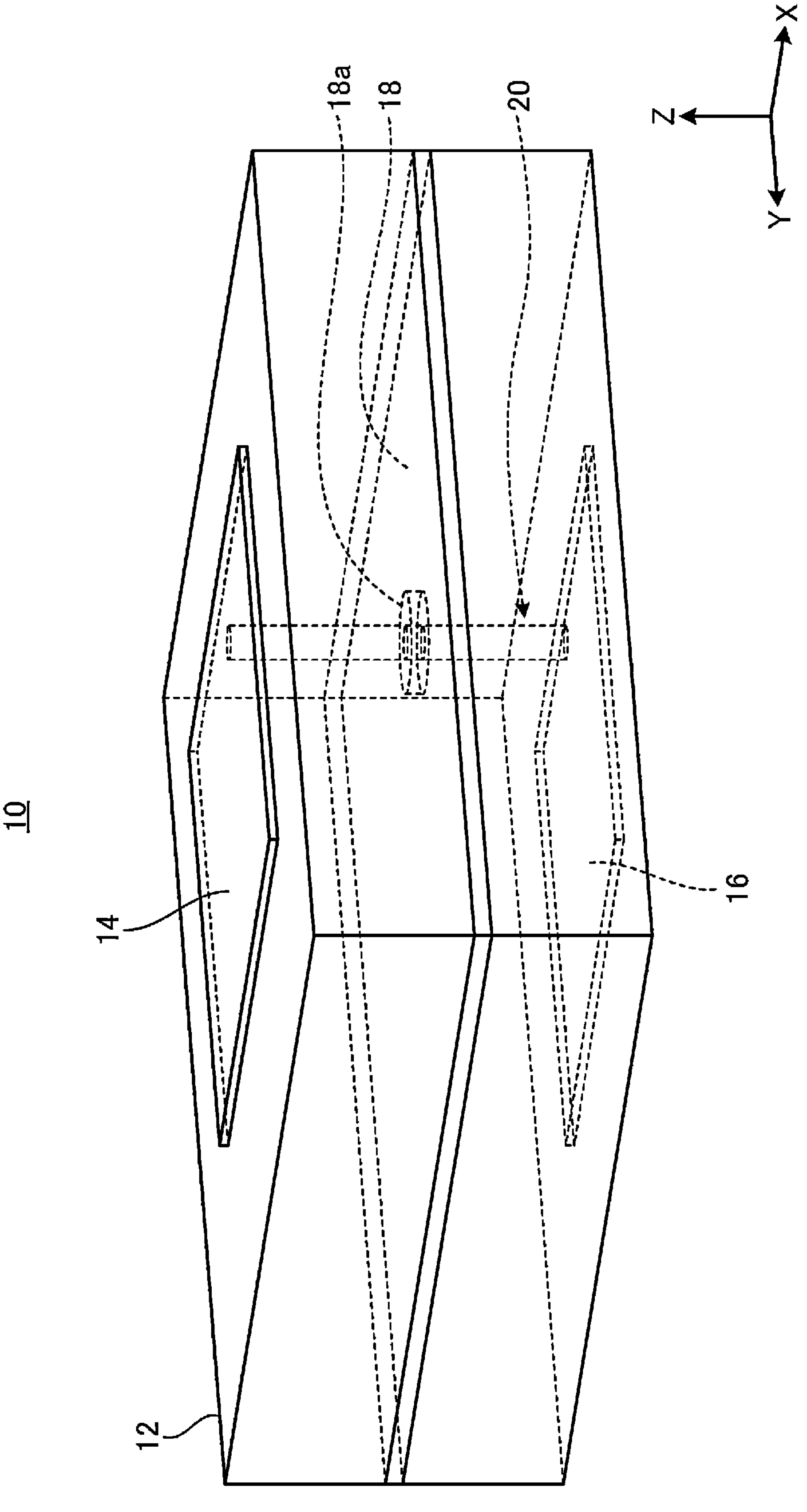
FIG. 2 illustrates a configuration example of a unit structure according to the first embodiment.

A configuration of the unit structure according to the first embodiment is described with reference to FIG. 2. FIG. 2 illustrates a configuration of the unit structure according to the first embodiment.

As illustrated in FIG. 2, the unit structure 10 includes a first resonator 14, a second resonator 16, a reference conductor 18, and a connection line path 20.

The first resonator 14 may be arranged on the substrate 12, extending on the XY plane. The substrate 12 may be, for example, a dielectric substrate made of a dielectric body. The first resonator 14 may be made of a conductor. The first resonator 14 may be, for example, a patch conductor formed in a rectangular shape. In the example illustrated in FIG. 2, the first resonator 14 is illustrated as the rectangular patch conductor, but the present disclosure is not limited thereto. The first resonator 14 may have, for example, a linear shape, a circular shape, a loop shape, or a polygonal shape other than a rectangular shape. That is, the shape of the first resonator 14 may be arbitrarily changed according to the design. The first resonator 14 resonates by an electromagnetic wave received from the +Z-axis direction.

The first resonator 14 radiates an electromagnetic wave during resonance. The first resonator 14 radiates the electromagnetic wave to the +Z-axis direction side during resonance.

The second resonator 16 may be arranged on the substrate 12 to extend on the XY plane at a position away from the first resonator 14 in the Z-axis direction. The second resonator 16 may be, for example, a patch conductor formed in a rectangular shape. In the example illustrated in FIG. 2, the second resonator 16 is illustrated as the rectangular patch conductor, but the present disclosure is not limited thereto. The second resonator 16 may have, for example, a linear shape, a circular shape, a loop shape, or a polygonal shape other than a rectangular shape. That is, the shape of the second resonator 16 may be arbitrarily changed according to the design. The shape of the second resonator 16 may be the same as or different from the shape of the first resonator 14. The area of the second resonator 16 may be the same as or different from the area of the first resonator 14.

The second resonator 16 radiates an electromagnetic wave during resonance. The second resonator 16, for example, radiates the electromagnetic wave to the −Z-axis direction side. The second resonator 16 radiates the electromagnetic wave to the −Z-axis direction side during resonance. The second resonator 16 resonates by receiving the electromagnetic wave from the −Z-axis direction.

The second resonator 16 may resonate at a phase different from that of the first resonator 14. The second resonator 16 may resonate in a direction different from the resonance direction of the first resonator 14 in the XY plane direction. For example, when the first resonator 14 resonates in the X-axis direction, the second resonator 16 may resonate in the Y-axis direction. The resonance direction of the second resonator 16 may change with time in the XY plane direction corresponding to a change with time in the resonance direction of the first resonator 14. The second resonator 16 may radiate the electromagnetic wave received by the first resonator 14 with a first frequency band thereof attenuated.

The reference conductor 18 may be arranged between the first resonator 14 and the second resonator 16 in the substrate 12. The reference conductor 18 may be, for example, at the center between the first resonator 14 and the second resonator 16 in the substrate 12, but the present disclosure is not limited thereto. For example, the reference conductor 18 may be at a position where the distance from the reference conductor 18 to the first resonator 14 differs from the distance from the reference conductor 18 to the second resonator 16. The reference conductor 18 has a through-hole 18*a* through which the connection line path 20 extends. The reference conductor 18 surrounds at least a part of the connection line path 20.

The connection line path 20 may be made of a conductor. The connection line path 20 is located between the first resonator 14 and the second resonator 16 in the Z-axis direction. The Z-axis direction may also be referred to as a first direction, for example. The connection line path 20 may be connected to each of the first resonator 14 and the second resonator 16. Although the connection line path 20 passes through the through-hole 18*a*, the connection line path 20 is not in contact with the reference conductor 18. The connection line path 20 may be magnetically or capacitively connected to each of the first resonator 14 and the second resonator 16, for example. For example, the connection line path 20 may be electrically connected to each of the first resonator 14 and the second resonator 16. The connection line path 20 is connected to a side of the first resonator 14 parallel to the X-axis direction and is connected to a side of the second resonator 16 parallel to the X-axis direction. The connection line path 20 may be a path parallel to the Z-axis direction. The connection line path 20 may be a third resonator. That is, the unit structure 10 may be represented by an equivalent circuit including three LC resonant circuits. For example, the unit structure 10 may be represented by an equivalent circuit including three or more LC resonant circuits.

The unit structure 10 magnetically or capacitively connects the first resonator 14 and the second resonator 16 or electrically connects them to be combined. By combining the three resonators, the unit structure 10 transmits a high frequency excited by an electromagnetic wave incident on the first resonator 14 through the composite resonator. The unit structure 10 may have any one or more functions of a phase shift, a band-pass filter, a high-pass filter, and a low-pass filter depending on the transmission characteristics of the composite resonator.

The unit structure 10 changes the phase of the electromagnetic wave incident on the first resonator 14 and radiates the electromagnetic wave from the second resonator 16. The amount of change in phase changes depending on the length of the connection line path 20. The amount of change in phase also changes depending on the area of the first resonator 14 or the second resonator 16.

The antenna element 3 is formed in the XY plane around the arranged unit structures 10. The antenna element 3 may be made of a conductor. The antenna element 3 receives the electromagnetic wave of a second frequency band different from the electromagnetic wave of a first frequency band used in data communication between a base station and a communication device. Specifically, the antenna element 3 receives electromagnetic waves of a frequency band lower than the first frequency band. For example, the antenna element 3 receives electromagnetic waves in the tens to hundreds of megahertz (MHz) band. The antenna element 3 receives a control signal for controlling the composite antenna 1 to improve, for example, a radio wave environment including reception sensitivity of the communication device that communicates with the base station via the composite antenna 1. In the antenna element 3, a portion parallel to the X-axis has a length L1, and a portion parallel to the Y-axis has a length L2. A total length (L1+L2) of the antenna element 3 is, for example, λ/4 or λ/2 of the wavelength of electromagnetic wave received by the antenna element 3.

When the composite antenna 1 is mounted on a support device having the gimbal mechanism, the control signal received by the antenna element 3 may be a signal for controlling the gimbal, for example, to change the relative angle between the composite antenna 1 and the base station.

The control signal received by the antenna element 3 may be, for example, a signal for instructing the magnitude of a voltage applied to the unit structure 10 when the unit structure 10 of the composite antenna 1 has a structure in which the resonance frequency is variable in accordance with the magnitude of the applied voltage.

The antenna port 4 is provided between the antenna element 3 and the reference conductor 18. Specifically, the antenna port 4 is provided between the antenna element 3 and the reference conductor 18 at an end portion of a portion of the antenna element 3 parallel to the X-axis. The antenna element 3 is electromagnetically connected to the reference conductor 18 via the antenna port 4. That is, the reference conductor 18 may function as the ground of the antenna element 3.

The antenna port 4 is electromagnetically connected to a controller (not illustrated) that transmits and receives the control signal from the base station. The controller may be disposed, for example, on the reference conductor 18. The antenna element 3 receives power supplied from the controller via the antenna port 4.

That is, the composite antenna 1 has a structure of integrating the function of reflecting or permeating the electromagnetic wave of a first frequency band in a specific direction and the function of receiving the electromagnetic wave of a second frequency band lower than the first frequency band. This eliminates the need to use another antenna to receive the electromagnetic wave of the second frequency band, thus reducing the size of the composite antenna 1.

First Variation of First Embodiment

Figure 3:
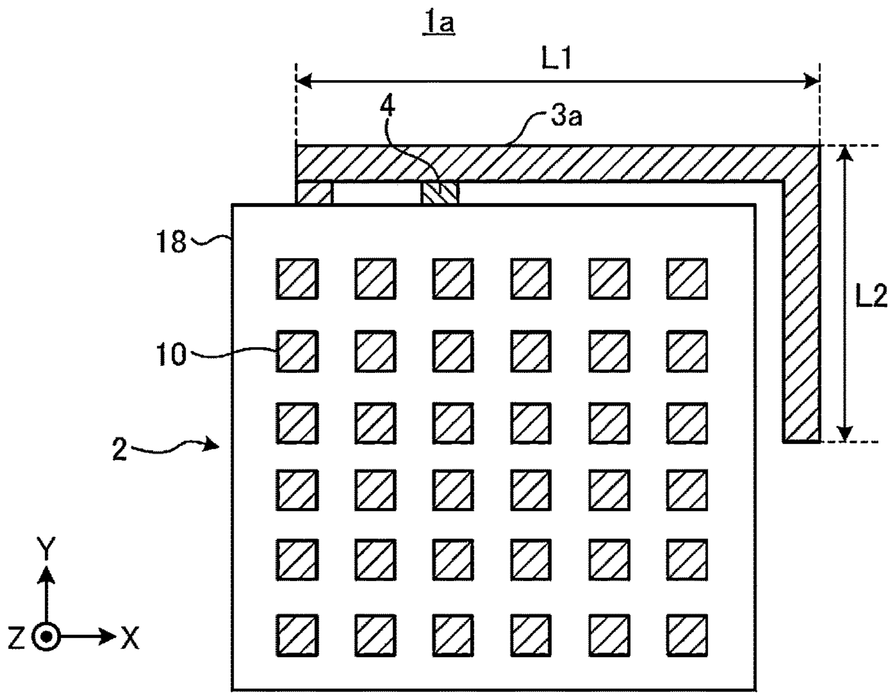
FIG. 3 illustrates a configuration example of a composite antenna according to a first variation of the first embodiment.

A configuration example of a composite antenna according to a first variation of the first embodiment is described with reference to FIG. 3. FIG. 3 illustrates a configuration example of the composite antenna according to the first variation of the first embodiment.

As illustrated in FIG. 3, a composite antenna 1*a* differs from the composite antenna 1 illustrated in FIG. 1 in that an antenna element 3*a* is directly connected to the reference conductor 18 and also differs in the position where the antenna port 4 is provided.

The end portion of a portion of the antenna element 3*a* parallel to the X-axis is directly connected to the reference conductor 18. The antenna element 3*a* may be directly connected to the reference conductor 18, for example, at the end portion of a portion parallel to the Y-axis.

The antenna port 4 is provided on a side surface of a portion of the antenna element 3*a* parallel to the X-axis between the antenna element 3*a* and the reference conductor 18. The antenna port 4 may be provided on a side surface of a portion of the antenna element 3*a* parallel to the Y-axis between the antenna element 3*a* and the reference conductor 18.

Second Variation of First Embodiment

Figure 4:
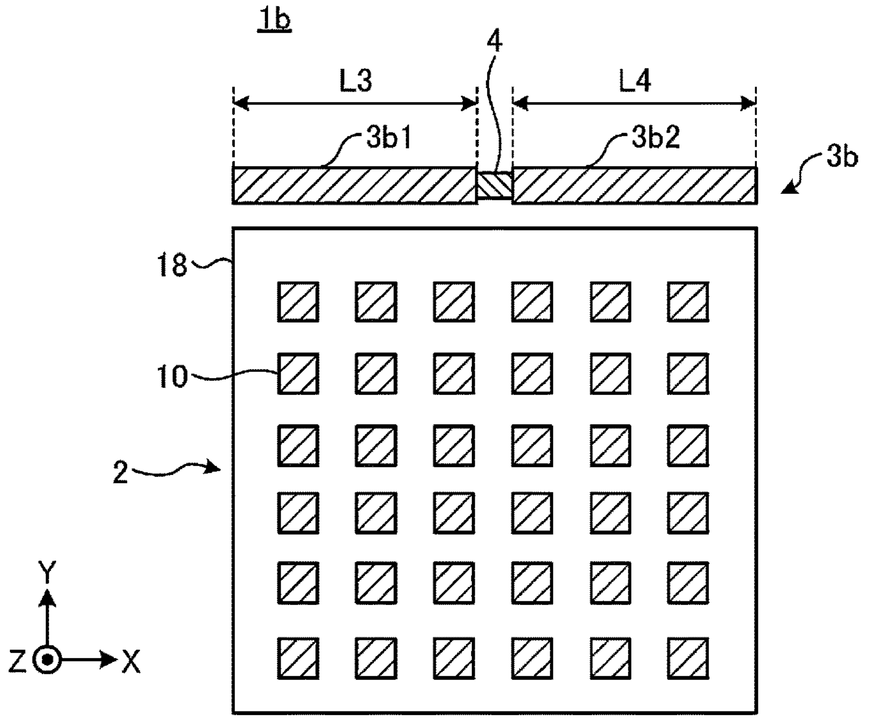
FIG. 4 illustrates a configuration example of a composite antenna according to a second variation of the first embodiment.

A configuration example of a composite antenna according to a second variation of the first embodiment is described with reference to FIG. 4. FIG. 4 illustrates a configuration example of the composite antenna according to the second variation of the first embodiment.

As illustrated in FIG. 4, a composite antenna 1*b* differs from the composite antenna 1 illustrated in FIG. 1 in the provision of two antenna elements 3*b*1 and 3*b*2 in an antenna element 3*b* and the position where the antenna port 4 is provided.

The antenna elements 3*b*1 and 3*b*2 are formed near the reference conductor 18. The antenna elements 3*b*1 and 3*b*2 are formed such that their longitudinal directions are parallel to the X-axis. The antenna elements 3*b*1 and 3*b*2 are arranged in series along the X-axis. The antenna elements 3*b*1 and 3*b*2 are not in contact with the reference conductor 18.

The length of the antenna elements 3*b*1 is L3. The length of the antenna elements 3*b*2 is L4. The length L3 and the length L4 may be the same or different. A total length (L3+L4) of the antenna element 3*b* is, for example, λ/4 or λ/2 of the wavelength of the electromagnetic wave received by the antenna element 3*b*.

The antenna elements 3*b*1 and 3*b*2 may be formed, for example, to the right of the reference conductor 18. In this case, the antenna elements 3*b*1 and 3*b*2 are preferably formed with their longitudinal directions being parallel to the Y-axis. In this case, the antenna elements 3*b*1 and 3*b*2 are preferably arranged in series parallel to the Y-axis.

The antenna port 4 is provided between the antenna elements 3*b*1 and 3*b*2. The antenna port 4 is connected to the antenna elements 3*b*1 and 3*b*2. The antenna port 4 is not in contact with the reference conductor 18. That is, in the second variation of the first embodiment, the antenna elements 3*b*1 and 3*b*2 and the antenna port 4 are away from the reference conductor 18. The antenna elements 3*b*1 and 3*b*2 receive power supplied from the controller via the antenna port 4.

Third Variation of First Embodiment

Figure 5:
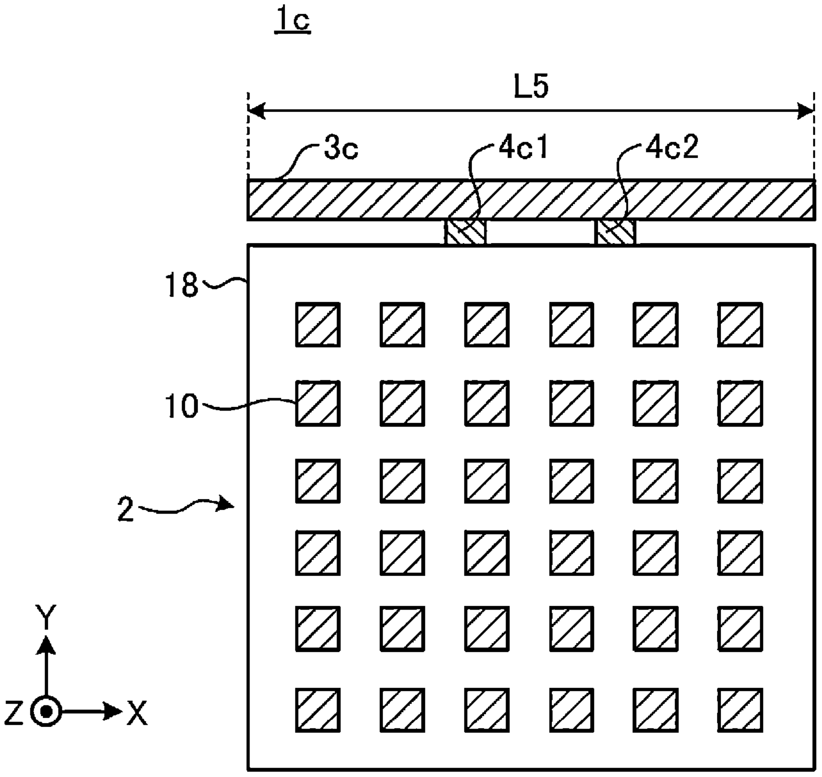
FIG. 5 illustrates a configuration example of a composite antenna according to a third variation of the first embodiment.

A configuration example of a composite antenna according to a third variation of the first embodiment is described with reference to FIG. 5. FIG. 5 illustrates a configuration example of the composite antenna according to the third variation of the first embodiment.

As illustrated in FIG. 5, a composite antenna 1*c* differs from the composite antenna 1 illustrated in FIG. 1 in terms of the shape of an antenna element 3*c* and the provision of two antenna ports 4*c*1 and 4*c*2.

The antenna element 3*c* is formed on the upper portion of the reference conductor 18. The antenna element 3*c* is formed such that its longitudinal direction is parallel to the X-axis. The length of the antenna element 3*c* in the longitudinal direction is L5. The length L5 is, for example, λ/4 or λ/2 of the wavelength of the electromagnetic wave received by the antenna element 3*c*.

The antenna ports 4*c*1 and 4*c*2 are provided on the upper portion of the reference conductor 18. The antenna ports 4*c*1 and 4*c*2 are provided between the reference conductor 18 and the antenna element 3*c*. The antenna element 3*c* is electromagnetically connected to the reference conductor 18 via the antenna ports 4*c*1 and 4*c*2.

The antenna ports 4*c*1 and 4*c*2 are respectively fed with control signals that can correspond to, for example, polarized waves of different directions. For example, the antenna port 4*c*1 is fed with a control signal that can correspond to a polarized wave in the X-axis direction. For example, the antenna port 4*c*2 is fed with a control signal that can correspond to a polarized wave in the Y-axis direction.

The antenna ports 4*c*1 and 4*c*2 are respectively fed with control signals that can correspond to, for example, electromagnetic waves of different frequency bands. For example, the antenna port 4*c*1 is fed with a control signal that can correspond to the electromagnetic wave of a relatively high frequency band. For example, the antenna port 4*c*2 is fed with a control signal that can correspond to the electromagnetic wave of a relatively low frequency band.

Second Embodiment

Figure 6:
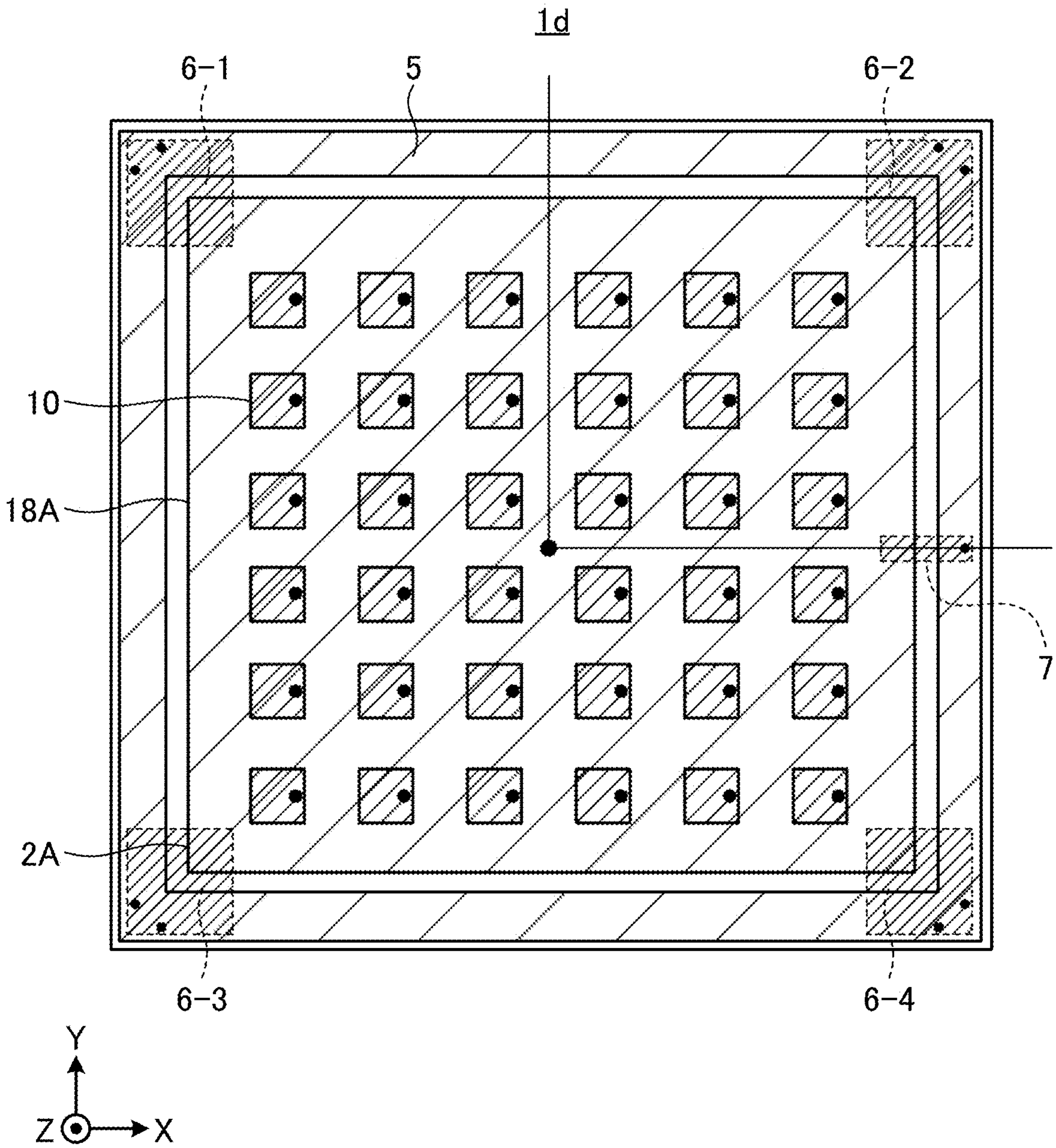
FIG. 6 illustrates a configuration example of a composite antenna according to a second embodiment.

A configuration example of a composite antenna according to a second embodiment is described with reference to FIG. 6. FIG. 6 illustrates a configuration example of the composite antenna according to the second embodiment.

As illustrated in FIG. 6, a composite antenna 1*d* includes a radio wave refracting plate 2A, a peripheral conductor 5, a first coupling conductor 6-1, a second coupling conductor 6-2, a third coupling conductor 6-3, a fourth coupling conductor 6-4, and an antenna port 7. The composite antenna 1*d* has a thin structure having a length in the Z-axis direction of, for example, about 0.5 millimeters (mm). The composite antenna 1*d* may function as an antenna.

The radio wave refracting plate 2A includes the plurality of unit structures 10 and a reference conductor 18A.

The reference conductor 18A may have both function as the ground of the composite antenna 1*d* and function as the antenna element. The reference conductor 18A may operate as a part of the resonator. That is, the reference conductor 18A may function as the antenna element that receives the electromagnetic wave of the second frequency band different from the electromagnetic wave of the first frequency band used in the data communication between the base station and the communication device.

The peripheral conductor 5 may be made of a conductor. The peripheral conductor 5 may surround the arranged unit structures 10. The peripheral conductor 5 may be made of, for example, a frame body following the shape of the reference conductor 18A. The peripheral conductor 5 may function as the ground of the reference conductor 18A when it functions as the antenna.

A gap may be formed between the reference conductor 18A and the peripheral conductor 5. The reference conductor 18A is capacitively connected to the peripheral conductor 5. The value of the capacitance generated between the reference conductor 18A and the peripheral conductor 5 changes depending on the medium in the gap and the area of the facing regions. The size of the gap and the area of the facing regions between the reference conductor 18A and the peripheral conductor 5 may be adjusted as appropriate in accordance with a desired resonant frequency. The medium in the gap between the reference conductor 18A and the peripheral conductor 5 may be adjusted as appropriate in accordance with a desired resonant frequency. A capacitor may be provided to connect the reference conductor 18A and the peripheral conductor 5. The capacitance of the capacitor may be adjusted as appropriate in accordance with the desired resonant frequency.

The first, second, third, and fourth coupling conductors 6-1, 6-2, 6-3, and 6-4 may be made of conductors. The first, second, third, and fourth coupling conductors 6-1, 6-2, 6-3, and 6-4 may be configured to capacitively connect to the reference conductor 18A and the peripheral conductor 5. The first, second, third, and fourth coupling conductors 6-1, 6-2, 6-3, and 6-4 are formed at different corners of a second surface (lower surface) facing a first surface (upper surface) on which the reference conductor 18A is provided in the Z-axis direction.

For example, the first to fourth coupling conductors 6-1 to 6-4 may have substantially square shapes. The first to fourth coupling conductors 6-1 to 6-4 may have different shapes from each other. Each of the first to fourth coupling conductors 6-1 to 6-4 is smaller than the reference conductor 18A. Each of the first to fourth coupling conductors 6-1 to 6-4 is electromagnetically connected to the peripheral conductor 5, for example, via the through-hole conductor or the like.

The composite antenna 1*d* includes the four coupling conductors of the first to fourth coupling conductors 6-1 to 6-4, but the present disclosure is not limited thereto. The number of coupling conductors included in the composite antenna 1*d* may be larger than or less than four.

The first to fourth coupling conductors 6-1 to 6-4 may be capacitively connected to the reference conductor 18A. Specifically, the first to fourth coupling conductors 6-1 to 6-4 may face the reference conductor 18A in the Z-axis direction and be capacitively connected to the reference conductor 18A. The values of the capacitance generated between the reference conductor 18A and the first to fourth coupling conductors 6-1 to 6-4 change depending on the distance between the reference conductor 18A and each of the first to fourth coupling conductors 6-1 to 6-4. The distance between the reference conductor 18A and the first to fourth coupling conductors 6-1 to 6-4 may be adjusted as appropriate in accordance with a desired resonant frequency.

The antenna port 7 may be made of a conductor. The antenna port 7 is provided, for example, on the same surface as the surface on which the first to fourth coupling conductors 6-1 to 6-4 are formed. The antenna port 7 may be located, for example, between the second coupling conductor 6-2 and the fourth coupling conductor 6-4. The position where the antenna port 7 is located is not limited to the example illustrated in FIG. 6. For example, the antenna port 7 may be connected to the reference conductor 18A at one end, for example, via the through-hole conductor or the like. The other end of the antenna port 7 is electromagnetically connected to a controller (not illustrated) that transmits and receives the control signal from the base station. The controller may be disposed, for example, on the peripheral conductor 5.

Transmission Characteristic of Electromagnetic Wave of First Frequency Band

Figure 7:
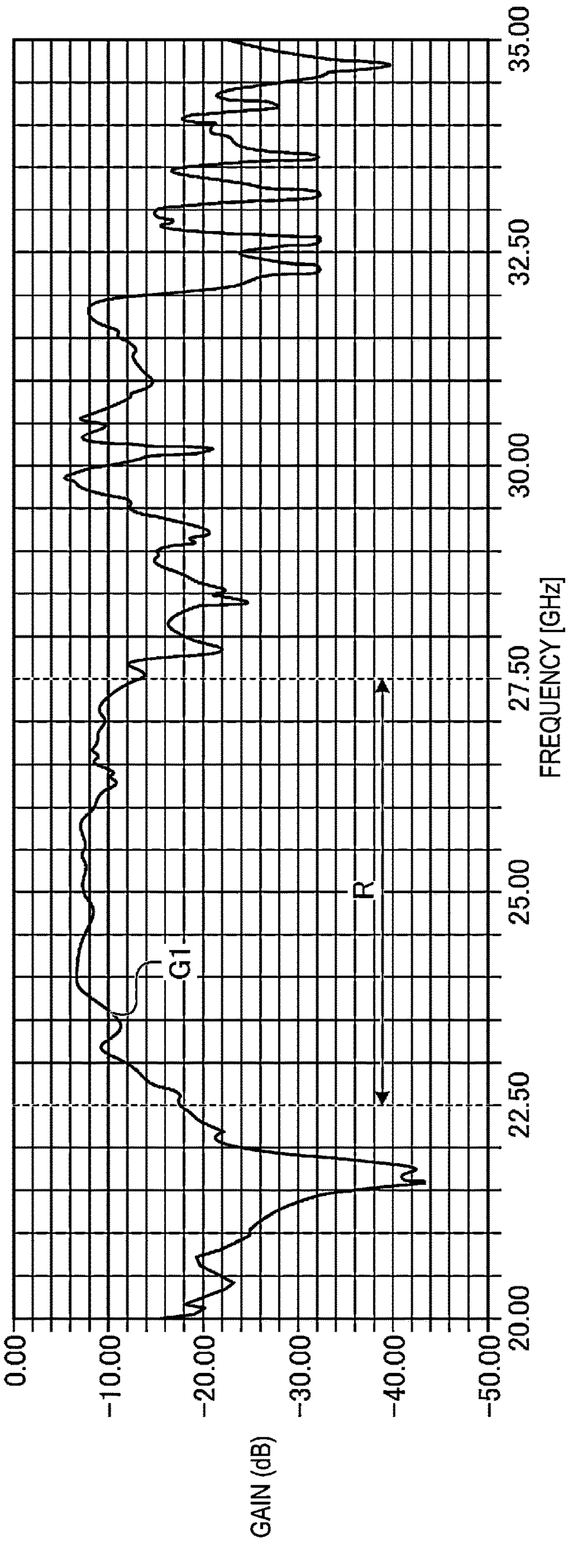
FIG. 7 is a graph showing a transmission characteristic of a composite antenna according to a third embodiment.

A transmission characteristic of a composite antenna according to a third embodiment is described with reference to FIG. 7. FIG. 7 is a graph showing the transmission characteristic of the composite antenna according to the third embodiment.

A line G1 shows a simulation result of the transmission characteristic of the composite antenna 1*d* illustrated in FIG. 6 when the electromagnetic wave of the first frequency band having a relatively high frequency arrives at the radio wave refracting plate 2A from the −Z-axis direction and is permeated in the +Z-axis direction. In FIG. 7, the horizontal axis represents the frequency (GHz) and the vertical axis represents the gain (dB). As indicated by the line G1, the radio wave refracting plate 2A permeates the electromagnetic wave well in the frequency band R near 22.50 GHz to 27.50 GHz. That is, even when the reference conductor 18A functions as the antenna element that receives the electromagnetic wave of the second frequency band having a relatively low frequency, the radio wave refracting plate 2A can achieve a good transmission characteristic with respect to the electromagnetic wave of the first frequency band.

Reflection Characteristic of Electromagnetic Wave of Second Frequency Band

Figure 8:
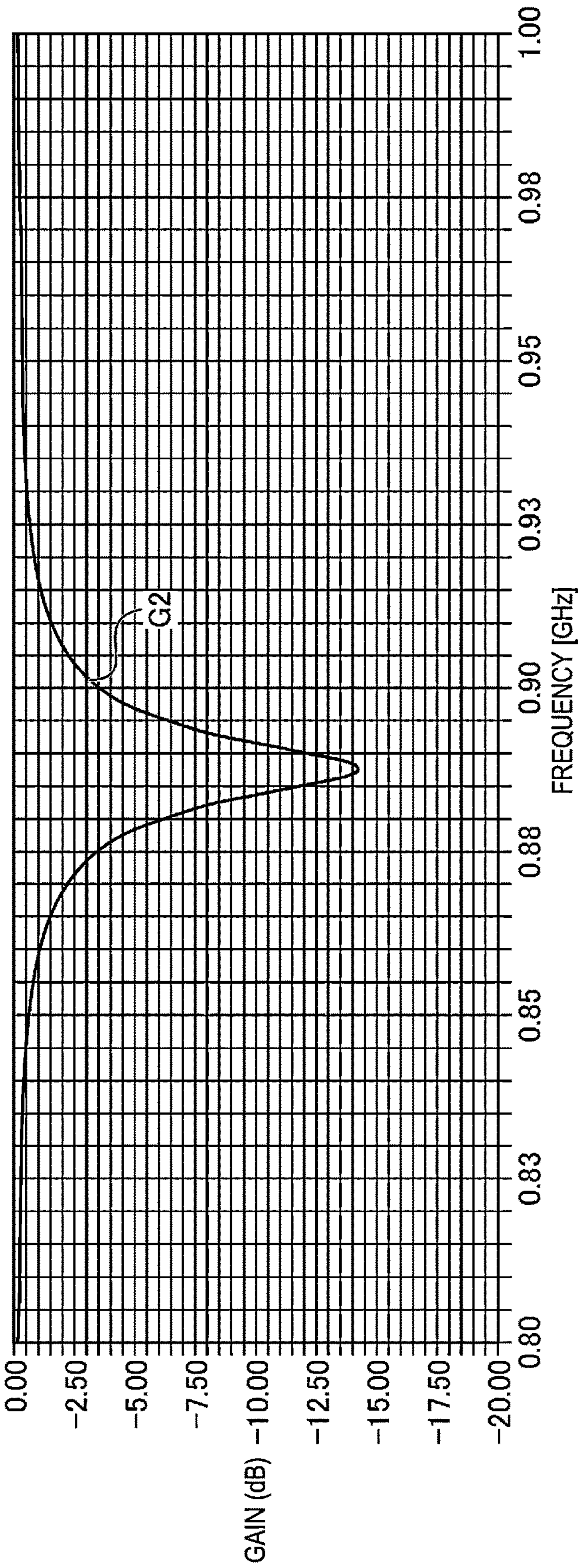
FIG. 8 is a graph showing a reflection characteristic of the composite antenna according to the third embodiment.

A reflection characteristic of the composite antenna according to the third embodiment is described with reference to FIG. 8. FIG. 8 is a graph showing the reflection characteristic of the composite antenna according to the third embodiment.

A line G2 shows a simulation result of the reflection characteristic of the composite antenna 1*d* illustrated in FIG. 8 when the electromagnetic wave of the second frequency band of a relatively low frequency arrives at the peripheral conductor 5 from the −Z-axis direction and is reflected. In FIG. 8, the horizontal axis represents the frequency (GHz) and the vertical axis represents the gain (dB). As indicated by the line G2, the gain (reflection coefficient) of the peripheral conductor 5 significantly drops at frequencies near 0.89 GHZ. This means that the composite antenna 1*d* functions as an antenna device having good characteristics when transmitting and receiving frequencies near 0.89 GHz. That is, even when the plurality of unit structures 10 is arranged in the reference conductor 18A, the composite antenna 1*d* can achieve a good reflection characteristic with respect to the electromagnetic wave of the second frequency band.

Embodiments of the present disclosure have been described above, but the present disclosure is not limited by the contents of the embodiments. Constituent elements described above include those that can be easily assumed by a person skilled in the art, those that are substantially identical to the constituent elements, and those within a so-called range of equivalency. The constituent elements described above can be combined as appropriate. Various omissions, substitutions, or modifications of the constituent elements can be made without departing from the spirit of the above-described embodiments.

The invention claimed is:

1. A composite antenna, comprising:

a plurality of unit structures arranged in a first plane direction;

a reference conductor serving as a reference potential of the plurality of unit structures; and an antenna element provided around the arranged plurality of unit structures and electromagnetically connected to the reference conductor, wherein the plurality of unit structures each comprises a first resonator extending in the first plane direction, a second resonator away from the first resonator in a first direction and extending in the first plane direction, and a connector magnetically or capacitively connecting the first resonator and the second resonator in the first direction.

2. The composite antenna according to claim 1, wherein the plurality of unit structures is configured to reflect or permeate an electromagnetic wave of a first frequency band from a base station in a specific direction, and the antenna element is configured to receive an electromagnetic wave including a control signal of a second frequency band different from the first frequency band from the base station.

3. The composite antenna according to claim 2, wherein the control signal comprises control information for improving a radio wave environment of a communication device that communicates with the base station using the radio wave of the first frequency band reflected or permeated in a specific direction by the plurality of unit structures.

4. The composite antenna according to claim 2, wherein a length of the antenna element is $\lambda/2$ or $\lambda/4$, where $\lambda$ represents a wavelength of the electromagnetic wave of the second frequency band.

5. The composite antenna according to claim 1, further comprising:

an antenna port connected to the reference conductor and the antenna element between the reference conductor and the antenna element.

6. A composite antenna, comprising:

a plurality of unit structures arranged in a first plane direction;

a reference conductor serving as a reference potential of the plurality of unit structures; and a peripheral conductor surrounding the arranged plurality of unit structures and capacitively connected to the reference conductor, wherein the plurality of unit structures each comprises a first resonator extending in the first plane direction, a second resonator away from the first resonator in a first direction and extending in the first plane direction, a connector magnetically or capacitively connecting the first resonator and the second resonator in the first direction, and an antenna port connected between the reference conductor and the peripheral conductor.

* * * * *